United States Patent
Kano et al.

[11] Patent Number: 6,042,940
[45] Date of Patent: Mar. 28, 2000

[54] SOLID ADHESIVE

[75] Inventors: Yoshimi Kano; Koji Seki; Atsushi Kaneko, all of Kuki, Japan

[73] Assignees: Buncho Corporation, Tokyo; Kotobuki & Co., Ltd., Kyoto-fu, both of Japan

[21] Appl. No.: 08/988,556

[22] Filed: Nov. 12, 1997

[30] Foreign Application Priority Data

Dec. 17, 1996 [JP] Japan .................................. 8-337019

[51] Int. Cl.$^7$ ....................................... B32B 7/12
[52] U.S. Cl. ................... 428/355 R; 428/424.4; 428/437
[58] Field of Search ................. 428/358, 424.4, 428/437; 52/18, 23, 25, 29, 145, 156; 156/DIG. 20

[56] References Cited

FOREIGN PATENT DOCUMENTS

| | | |
|---|---|---|
| 48-040835 B4 | 6/1973 | Japan . |
| 49-097067 | 9/1974 | Japan . |
| 50-078628 | 6/1975 | Japan . |
| 50-34581 | 11/1975 | Japan . |
| 59-25830 | 6/1984 | Japan . |
| 09151365 | 6/1997 | Japan . |

*Primary Examiner*—Merrick Dixon
*Attorney, Agent, or Firm*—Whitham, Curtis & Whitham

[57] ABSTRACT

A solid adhesive having adhesive resins, benzylidene sorbitol, isothyazoline preservatives, organic solvents, and about 25–60% water, the components being balanced such that the solid adhesive has good formability or shapability. A stick-shaped solid adhesive product made from the solid adhesive has a unique combination of shape-maintainability, bending strength, and crush strength.

11 Claims, No Drawings

SOLID ADHESIVE

BACKGROUND OF THE INVENTION

1. Field of the Invention

This invention relates to an improved solid adhesive, and in particular to such a solid adhesive which has good formability or shapability and can be formed into a stick which has a small diameter while having a unique combination of bending strength and crush strength at a room temperature.

2. Description of the Prior Art

There have been proposed various adhesives which are in solid states at a room temperature. For example, Japanese patent publication No. 34581/1975 discloses a solid adhesive which comprises a mixture of adhesive resins, benzylidene sorbitol, water and/or organic solvents. Japanese patent publication No. 25830/1984 relates to an improvement of the adhesive disclosed in Japanese patent publication No. 34581/1975, and discloses a solid adhesive which comprises adhesive resins, dibenzyliden (penta or hexa hydric) saccharide, water and organic solvents containing 3-methyl-3-methoxy-1-butanol. Japanese patent publication Nos. 34581/1975 and 25830/1984 are incorporated herein by reference (hereinafter referred to as "References").

This type of solid adhesive can be formed into a variety of shapes for a wide variety of uses. Recently, there is proposed a pen-type dispenser for selectively extending and retracting a stick-shaped object, e.g., a stick-shaped rubber eraser, a stick-shaped adhesive, a rouge or eyebrow pencil, or the like. The pen-type dispenser is disclosed in Japanese utility model provisional publication No. 74382/1994 which is incorporated herein by reference. This type of dispenser is slim-sized and handy to carry. Therefore, in this field, a stick-shaped object is required to have the smallest diameter possible, and required to have good bending strength and crush strength at a room temperature. Particularly, a stick-shaped solid adhesive is required to have a diameter of not more than about 0.47 inch (12 mm.) and required to have bending strength of not less than about 1.5 N (newton) and crush strength of not more than about 12 times as large as the bending strength at a room temperature.

Commercial grades of solid adhesives and the solid adhesives disclosed in the References can be formed into sticks each having a large diameter or a minimum diameter of about 0.62 inch (16 mm.), but can not be formed into sticks each of which has a smaller diameter while having good shape-maintainability, bending strength and crush strength at a room temperature.

Thus, it would be highly desirable to have a solid adhesive which has good formability or shapability and can be formed into a stick having a small diameter while having a unique combination of shape-maintainability, bending strength, and crush strength.

SUMMARY OF THE INVENTION

The present invention has been made with view to overcoming the foregoing problems of the prior art solid adhesives.

It is an object of this invention to provide a solid adhesive which has good formability or shapability and can be formed into a stick which at a room temperature has a unique combination of shape-maintainability, bending strength, and crush strength.

It is another object of this invention to provide a solid adhesive which can be formed into a stick having a diameter of not more than about 0.47 inch (12 mm.) at a room temperature.

It is still another object of this invention to provide a stick-shaped solid adhesive product which has a small diameter and a unique combination of shape-maintainability, bending strength, and crush strength at a room temperature.

In accordance with one aspect of the present invention, there is provided a solid adhesive which comprises adhesive resins, benzylidene sorbitol, isothyazoline preservatives, organic solvents, and about 25–60 weight percent water, wherein the components are balanced such that the solid adhesive has good formability or shapability.

In accordance with another aspect of the present invention, there is provided a stick-shaped solid adhesive product having a small diameter and made from a solid adhesive which comprises adhesive resins, benzylidene sorbitol, isothyazoline preservatives, organic solvents, and about 25–60 weight percent water, wherein the components of the solid adhesive are balanced such that at a room temperature the stick-shaped solid adhesive product has a unique combination of shape-maintainability, bending strength, and crush strength.

Throughout this application, unless otherwise indicated, percent (%) means percent by weight.

DETAILED DESCRIPTION OF THE PREFERRED EMBODIMENTS

According to the present invention, adhesive resins are present in the solid adhesive to benefit adhesion provided by the solid adhesive. As adhesive resins, there may be employed adhesive resins disclosed in the References. For example, adhesive resins may be selected from the group consisting of polyvinyl acetate homopolymer, polyvinyl acetate copolymer, partially or perfectly saponified polyvinyl alcohol, polyvinyl butyral, polyvinylpyrrolidone, polyacryl acid salt, polymethacryl acid salt, polyacrylate, polymethacrylate, various gums, polysaccharide, and rubbers. Adhesive resins may be a mixture of more than one of these chemicals. Preferably, adhesive resins are a mixture of polyvinyl alcohol and polyvinylpyrrolidone. At least about 15%, better yet at least about 20%, adhesive resins in this solid adhesive have been found to benefit good adhesion provided by the solid adhesive. Too much adhesive resins can not be dissolved in water. Therefore, adhesive resins are restricted preferably to about 15–42% and better yet to about 20–36% in the solid adhesive.

Benzylidene sorbitol is present in this solid adhesive to act as a gelatinizer. As benzylidene sorbitol, there may be employed chemicals which are used as benzylidene sorbitol in the References. Among the chemicals, dibenzyliden (penta or hexa hydric) saccharide is preferable, and dibenzyliden sorbitol is better yet. At least about 0.3%, better yet at least about 0.8%, benzylidene sorbitol is present in the solid adhesive to benefit the strength properties of a stick-shaped product made from this solid adhesive. Too much benzylidene sorbitol can not be dissolved in organic solvents. Therefore, benzylidene sorbitol is limited preferably to about 0.3–6% and better yet to about 0.8–4% in the solid adhesive.

Benzylidene sorbitol dissolves in much organic solvents, whereby gel is produced. If water is substituted for a portion of organic solvents, the strength of gel produced increases. For this purpose, at least about 25%, better yet at least about 28% water is present in this solid. However, too much water causes gel to become unstable and causes the strength of the solid adhesive to decrease, since benzylidene sorbitol does not dissolve in water. Accordingly, water is restricted to about 25–60%, preferably to about 28–57% in this solid adhesive.

Since this solid adhesive contains much water, there is a possibility that various germs will breed in this solid adhesive during long storage and use. The breeding of various germs adversely affects the properties of the solid adhesive. To prevent the breeding of various germs in the solid adhesive, this solid adhesive contains at least about 0.001%, preferably about 0.003%, better yet at least about 0.005% isothyazoline preservatives. Too much isothyazoline preservatives do not materially benefit the properties of the solid adhesive and result in increased costs of the solid adhesive. Accordingly, isothyazoline preservatives are limited to about 0.001–0.5%, preferably to about 0.003–0.1%, and better yet to about 0.005–0.05% in this solid adhesive. Isothyazoline preservatives may be selected from the group consisting of 1,2-benzisothiazoline-3-on, methylisothiazoline, octylisothiazoline, and isothiazolinone. Isothyazoline preservatives may be a mixture of more than one of these chemicals. Among the chemicals, 1,2-benzisothiazoline-3-on is preferable.

At least about 12% and preferably at least about 13%, organic solvents are present in the solid adhesive to facilitate dissolution of benzilidene sorbitol. Too much organic solvents adversely affect the adhesive and strength properties of a stick-shaped solid adhesive product made from the solid adhesive. Accordingly, organic solvents are limited preferably to about 12–50% and better yet to about 13–43%. As organic solvents, there may be employed organic solvents having miscibility with water, preferably, polar organic solvents. Specially, organic solvents may be selected from the group consisting of various alcohols, glycol alkyl ether, alkyl ester and pyrrolidone derivatives. More particularly, organic solvents may be selected from the group consisting of 3-methoxy-3-methyl-1-butanol, N-methyl-2-pyrrolidone, 2-butoxy ethanol, isopropyl alcohol, 1-ethoxy-2-propanol, 1-methoxy-2-propanol, and 2-ethoxy ethanol. Organic solvents may be a mixture of more than one of these chemicals. Among them, glycol (having 2 to 6 carbon atoms) alkyl (having 1 to 3 carbon atoms) mono ether is particularly preferable.

Additional chemicals may be present in this solid adhesive. For example, about 0.1–1%, better yet about 0.3–0.7%, rust inhibitors can be present in this solid adhesive to prevent rust from forming on metallic devices for forming this solid adhesive and for forming this solid adhesive into stick-shaped products. Preferably, benzotriazole anticorrosives are present in the solid adhesive. Also, perfume and/or pigment can be present in this solid adhesive.

The solid adhesive according to the present invention is prepared by mixing the respective components using any suitable conventional techniques, for example, mixing techniques disclosed in the References. By using any suitable technique, the prepared solid adhesive can be easily formed into stick-shaped products, each having a small diameter, e.g., a diameter of not more than about 0.47 inch (12 mm.). Then the stick-shaped product is used in the adhesive dispenser described above, it have a diameter of about 0.39–0.15 inch (10–4 mm.), preferably about 0.31–0.19 inch (8–5 mm.), better yet about 0.31 inch (8 mm.). Incidentally, a length of a stick-shaped product can be arbitrarily designated. When the stick-shaped product is to be used in the adhesive dispenser, it has a length of preferably about 1.1–3.1 inch (30–80 mm.), better yet about 1.7–2.5 inch (45–65 mm.).

The stick-shaped product made from the solid adhesive provides the desired combination of bending strength, crush strength, and shape-maintainability that are characteristic of the stick-shaped product according to the present invention. More particularly, the stick-shaped product made from the solid adhesive of this invention has bending strength of not less than about 1.5N (newton) and crush strength of not more than about 12 times as large as the bending strength at a room temperature. Incidentally, when the stick-shaped product is used in the adhesive dispenser, preferably, it has bending strength of about 1.5–3N (newton) and crush strength of about 12–5 times as large as the bending strength. The stick-shaped product made from the solid adhesive of the present invention is unbreakable and uncrushable, and is easy to apply to a surface of a paper with the application of a proper force.

The bending strength of the stick-shaped product can be easily measured by 6.5 bending strength testing in accordance with Japanese Industrial Standards 6026 (JIS 6026). In summary, a specimen of the stick-shaped product is allowed to stand in a thermostat of about 77° F. (25° C.) for one hour, immediately thereafter it is taken out of the thermostat and laid on two fulcrums. In this condition, loads are applied to the specimen at a middle section thereof. The bending strength can be determined by a load value measured when the specimen is broken by the application of loads. Crush strength testing is conducted using a flat base and a disk-like loading tip having a diameter of about 0.47 inch (12 mm). More particularly, the crush strength testing is conducted by laying a specimen of the stick-shaped product of about 77° F. (25° C.) on the flat base and bringing the loading tip near the specimen on the flat base at a speed of about 0.15 inch (4 mm.) per second. The crush strength can be determined by a load value measured when the specimen begins to be crushed by the approaching tip.

The solid adhesive of the present invention can be formed into a stick-shaped product having a diameter of not more than about 0.47 inch (12 mm.), so that the stick-shaped product made from the solid adhesive is suitable specially for use in the pen-type dispenser described above. It can be stored in a cartridge case as a spare adhesive for the pen-type dispenser and, if needed, is taken out of the cartridge case to be used in the pen-type dispenser. Additionally, the stick-shaped product made from the solid adhesive has a small diameter, so that it can be easily applied onto a minute portion of a surface of a paper.

EXAMPLES

Set forth in Table are the weight percent compositions of Examples 1–8 of the solid adhesive according to the present invention and the results of bending strength and crush strength testings for stick-shaped products of Examples 1–8.

TABLE

| Example No. | 1 | 2 | 3 | 4 | 5 | 6 | 7 | 8 |
|---|---|---|---|---|---|---|---|---|
| 3-methoxy-3-methyl-1-butanol | 10 | 4 | 30 | 0 | 20 | 0 | 0 | 0 |
| N-methyl-2-pyrrolidone | 8 | 0 | 0 | 15 | 0 | 0 | 0 | 0 |
| 2-butoxy ethanol | 0 | 0 | 10 | 0 | 0 | 0 | 0 | 0 |

TABLE-continued

| Example No. | 1 | 2 | 3 | 4 | 5 | 6 | 7 | 8 |
|---|---|---|---|---|---|---|---|---|
| isopropyl alcohol | 0 | 0 | 0 | 0 | 15 | 0 | 0 | 0 |
| 1-ethoxy-2-propanol | 0 | 0 | 0 | 0 | 0 | 30 | 0 | 0 |
| 1-methoxy-2-propanol | 0 | 31 | 0 | 0 | 0 | 0 | 40 | 0 |
| 2-ethoxy ethanol | 0 | 0 | 0 | 0 | 0 | 0 | 0 | 35 |
| di-benziliden sorbitol | 1.4 | 2 | 3 | 1.5 | 2 | 2 | 2.4 | 2 |
| water | 55 | 35 | 30 | 55 | 35 | 40 | 30 | 35 |
| polyvinyl alcohol (degree of polymerization: 1700 degree of saponification: 87 mole %) | 2 | 0 | 3.6 | 1.5 | 1.5 | 1.5 | 0 | 0 |
| polyvinyl alcohol (degree of polymerization: 1700 degree of saponification: 99 mole %) | 1 | 0 | 0 | 0.5 | 0.5 | 0.5 | 0 | 0 |
| polyvinyl alcohol (degree of polymerization: 500 degree of saponification: 87 mole %) | 0 | 10 | 0 | 0 | 0 | 0 | 0 | 0 |
| polyvinyl alcohol (degree of polymerization: 1400 degree of saponification: 87 mole %) | 0 | 0 | 0 | 0 | 0 | 0 | 4 | 5 |
| polyvinyl pyrrolidone (molar weight: 630.000) | 16.8 | 14 | 16.8 | 16.8 | 15 | 15 | 14 | 15 |
| polyvinyl pyrrolidone (molar weight: 38.000) | 6.7 | 7 | 6.7 | 6.7 | 8.5 | 8.5 | 7 | 8.5 |
| 1,2-benzisothiazoline-3-on | 0.01 | 0.01 | 0.01 | 0.01 | 0.01 | 0.01 | 0.01 | 0.01 |
| 1-hydroxy benzotriazole | 0.5 | 0.5 | 0.5 | 0.5 | 0.5 | 0.5 | 0.5 | 0.5 |
| perfume | 0.2 | 0.4 | 0.2 | 0.1 | 0.1 | 0.1 | 0.6 | 0.1 |
| bending strength (newton) | 2 | 1.8 | 1.7 | 2 | 1.5 | 1.6 | 2.6 | 2 |
| crash strength (newton) | 8.6 | 16.2 | 10.3 | 16.2 | 12.7 | 16.2 | 27 | 22.5 |

Examples 1–8 were prepared using conventional techniques. More particularly, di-benzyliden sorbitol was mixed with organic solvents which comprise 3-methoxy-3-methyl-1-propanol and N-methyl-2-pyrrolidone, and heated to be dissolved. Adhesive resins, or polyvinyls alcohol and polyvinylpyrrolidone were dissolved in water. Di-benzyliden sorbitol dissolved in organic solvents was then added to dissolved polyvinylalcohol and polyvinylpyrrolidone, and mixed at a controlled temperature of about 176–194° F. (80–90° C.). The remaining components were then added to the mixture.

In order to form specimens of stick-shaped products for use in the dispenser described above, each of constitutes of Examples 1–8 prepared in the above manner was poured into a mold for forming the solid adhesive of the present invention into sticks which mold was previously prepared. Each of Examples 1–8 was then cooled to be solidified, whereby the specimen having a diameter of about 0.31 inch (8 mm.) was made. Incidentally, a holder acting as means to hold a stick-shaped product when the stick-shaped product is used in the dispenser, was previously received in the mold. The holder was combined with the stick-shaped product simultaneously with forming of the stick-shaped product in the mold.

Each of the stick-shaped product specimens of Examples 1–8 was taken out of the mold, cut to a predetermined length (2.0 inch (52 mm.)), and stored in a cartridge case.

To demonstrate the unique combination of bending strength and crush strength which are provided by the stick-shaped products of the present invention, each of the stick-shaped product specimens was taken out of the cartridge cases. Bending strength testing for each stick-shaped product specimen was conducted in accordance with 6.5 bending strength testing of JIS-6026. As described above, bending strength of each stick-shaped product specimen was determined by a load value measured when the stick-shaped product specimen was broken by a load applied to the stick-shaped product specimen. Crush strength testing for each stick-shaped product specimen was conducted using the flat base and the disk-like loading tip having a diameter of 0.47 inch (12 mm.). More particularly, the crush strength testing is conducted by laying a stick-shaped product specimen of about 77° F. (25° C.) on the flat base and bringing the loading tip near the stick-shaped product specimen on the flat base at a speed of about 0.15 inch (4 mm.) per second. Crush strength was determined by a load value measured when the stick-shaped product specimen began to be crushed. The results of bending strength and crush strength testings for Examples 1–8 are shown in Table. The data on the bending strength and crush strength which are presented in Table show the unique combination of bending strength and crush strength which are provided by the stick-shaped products made from the solid adhesive in accordance with the present invention.

In order to demonstrate shape-maintainability and storability of the stick-shaped products of Examples 1–8, the stick-shaped product specimens were stored in polypropylene refill cases. The cases having the stick-shaped product specimens stored therein were received in and allowed to stand in a thermostat of 122° F. (50° C.) for 24 hours. The cases having the stick-shaped product specimens contained therein were then taken out of the thermostat and cooled to a room temperature. It was recognized that when the stick-shaped product specimens were taken out of the cases, they did not lose their shapes and could be easily taken out of the cases without any trouble.

The terms and expressions that have been employed herein are used as terms of description and not of limitation. There is no intention in the use of such terms and expressions to exclude any equivalents of the features described or any portions thereof. It is recognized, however, that various modifications are possible within the scope of the invention claimed.

What is claimed is:

1. A solid adhesive comprising 15–42 weight percent adhesive resins, 0.3–6 weight percent benzylidene sorbitol, 0.001–0.5 weight percent isothyazoline preservatives, 12–50 weight percent polar organic solvents, and about 25–60 weight percent water, wherein the components are balanced such that said solid adhesive has good formability or shapability, and wherein said solid adhesive has a bending strength of at least 1.5 N at room temperature and a crush strength of not more than about 12 times as large as the bending strength.

2. A solid adhesive as defined in claim 1, wherein adhesive resins are a mixture of polyvinyl alcohol and polyvinylpyrrolidone.

3. A solid adhesive as defined in claim 1, wherein benzylidene sorbitol comprises dibenzyliden (penta or hexa hydric) saccharide.

4. A solid adhesive as defined in claim 1, wherein benzylidene sorbitol is di-benzyliden sorbitol.

5. A solid adhesive as defined in claim 1, wherein isothyazoline preservatives are 1,2-benzisothiazoline-3-on.

6. A solid adhesive as defined in claim 1, wherein polar organic solvents are glycol (having 2 to 6 carbon atoms) alkyl (having 1 to 3 carbon atoms) mono ether.

7. A solid adhesive as defined in claim 1, further containing at least one of rust inhibitor, perfume, and pigment.

8. A stick-shaped solid adhesive product made from the solid adhesive of claim 1, said stick-shaped solid adhesive product having a diameter of not more than about 0.47 inch (12 mm.).

9. A solid adhesive as defined in claim 1, wherein contains about 20–35% adhesive resins, about 0.8–4% benzylidene sorbitol, about 0.005–0.05% isothyazoline preservatives, and about 13–43% organic solvents.

10. A solid adhesive as defined in claim 9, wherein adhesive resins are a mixture of polyvinyl alcohol and polyvinylpyrrolidone, wherein benzylidene sorbitol comprises di-benzyliden sorbitol, wherein isothyazoline preservatives are 1,2-benzisothiazoline-3-on, and wherein organic solvents are glycol (having 2 to 6 carbon atoms) alkyl (having 1 to 3 carbon atoms) mono ether.

11. A solid adhesive as defined in claim 1, wherein adhesive resins are a mixture of polyvinyl alcohol and polyvinylpyrrolidone, wherein benzylidene sorbitol comprises di-benzyliden sorbitol, wherein isothyazoline preservatives are 1,2-benzisothiazoline-3-on, and wherein organic solvents are glycol (having 2 to 6 carbon atoms) alkyl (having 1 to 3 carbon atoms) mono ether.

* * * * *